Nov. 23, 1943.   O. E. SZEKELY   2,334,731
INTERNAL COMBUSTION ENGINE
Filed Dec. 19, 1941   4 Sheets-Sheet 1
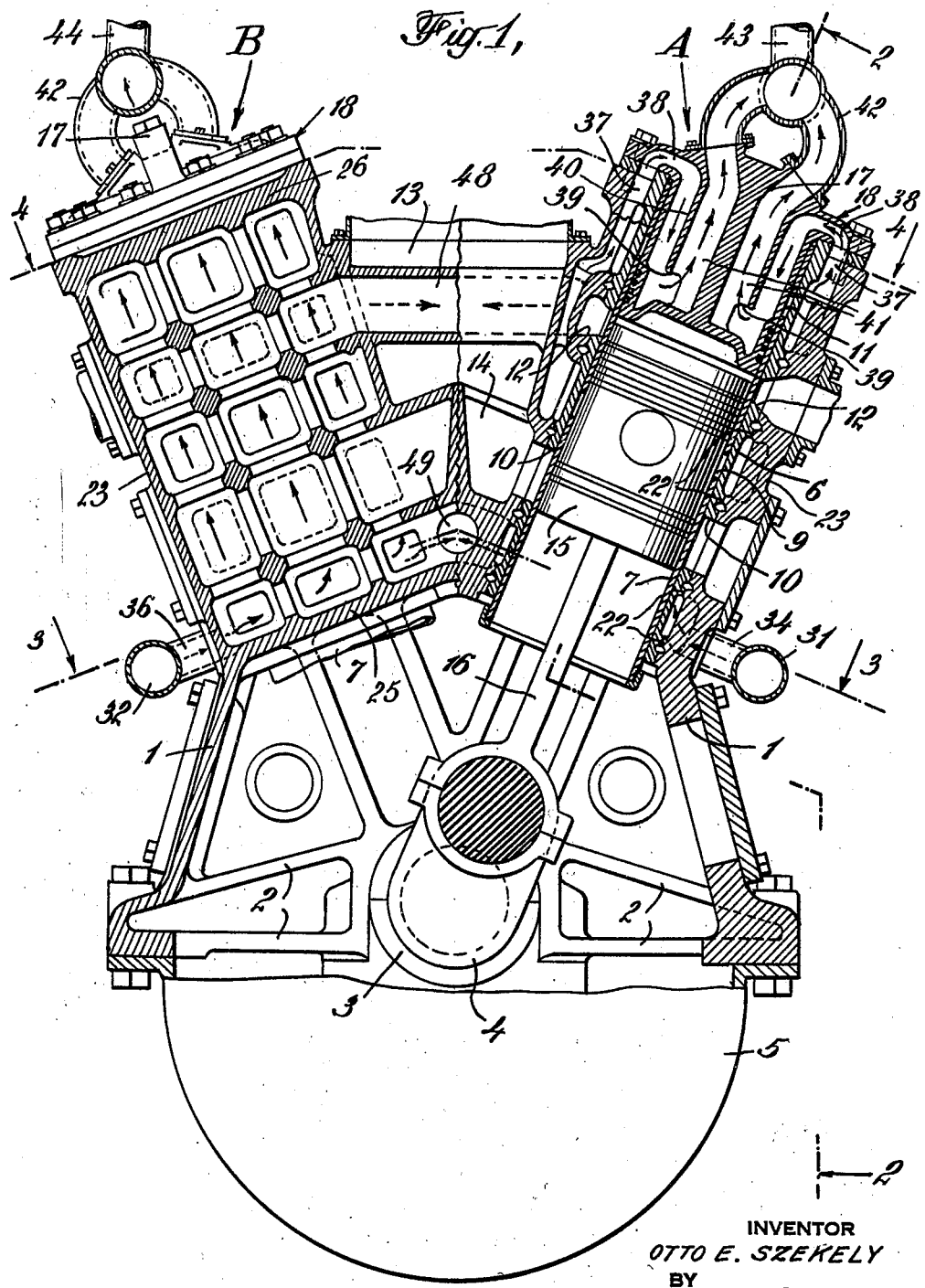
INVENTOR
OTTO E. SZEKELY
BY
HIS ATTORNEYS

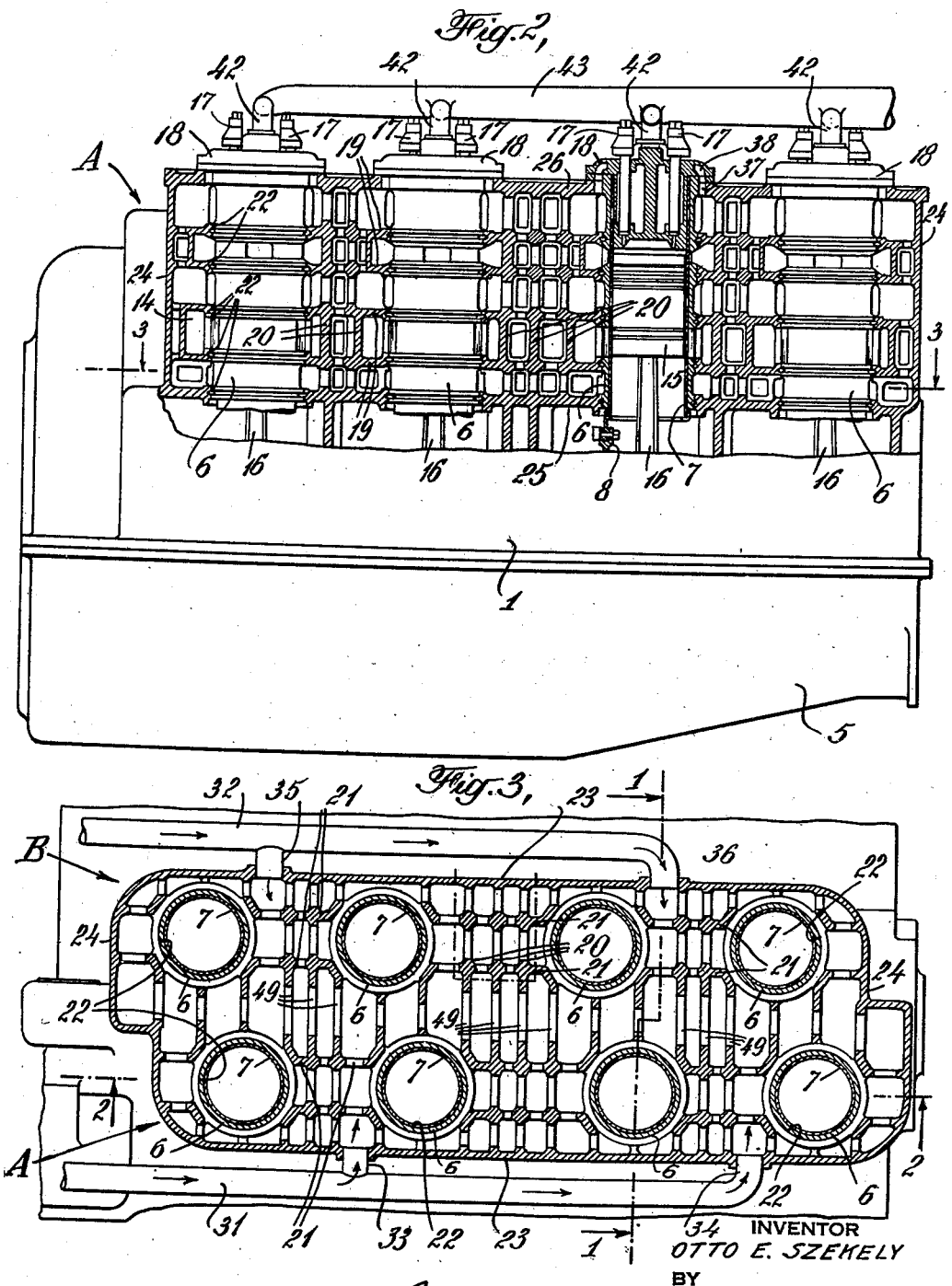

Nov. 23, 1943.    O. E. SZEKELY    2,334,731
INTERNAL COMBUSTION ENGINE
Filed Dec. 19, 1941    4 Sheets-Sheet 3
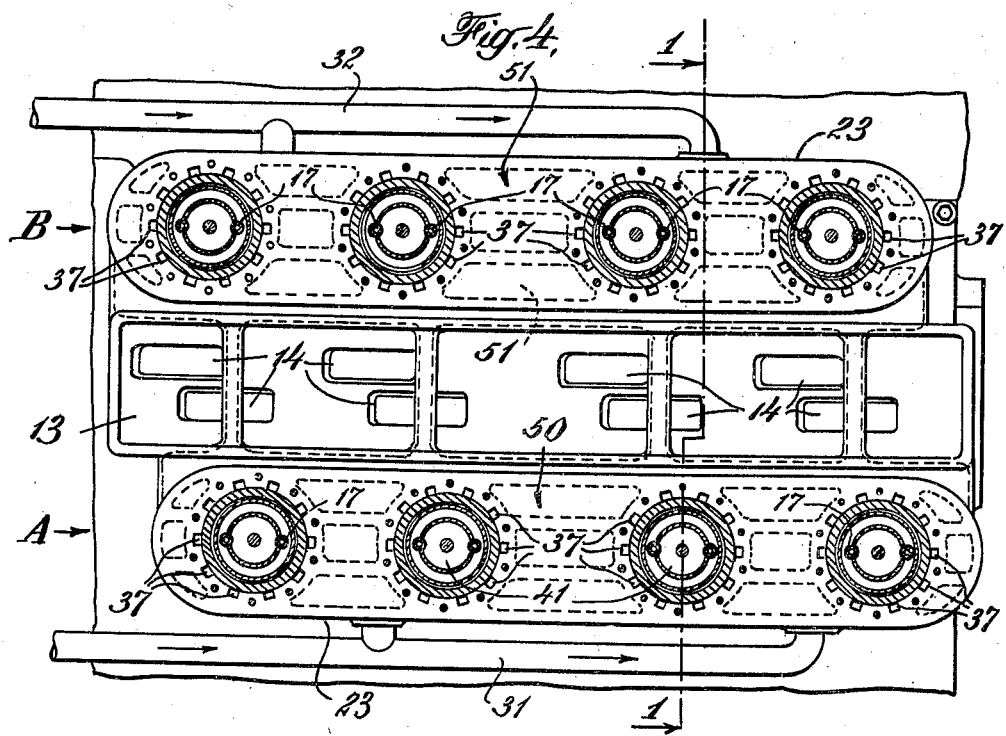
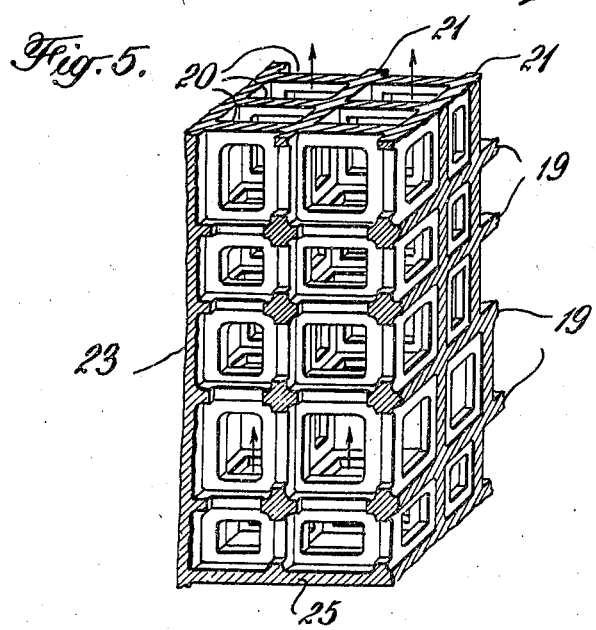
INVENTOR
OTTO E. SZEKELY
BY
HIS ATTORNEYS Nov. 23, 1943.    O. E. SZEKELY    2,334,731
INTERNAL COMBUSTION ENGINE
Filed Dec. 19, 1941    4 Sheets-Sheet 4
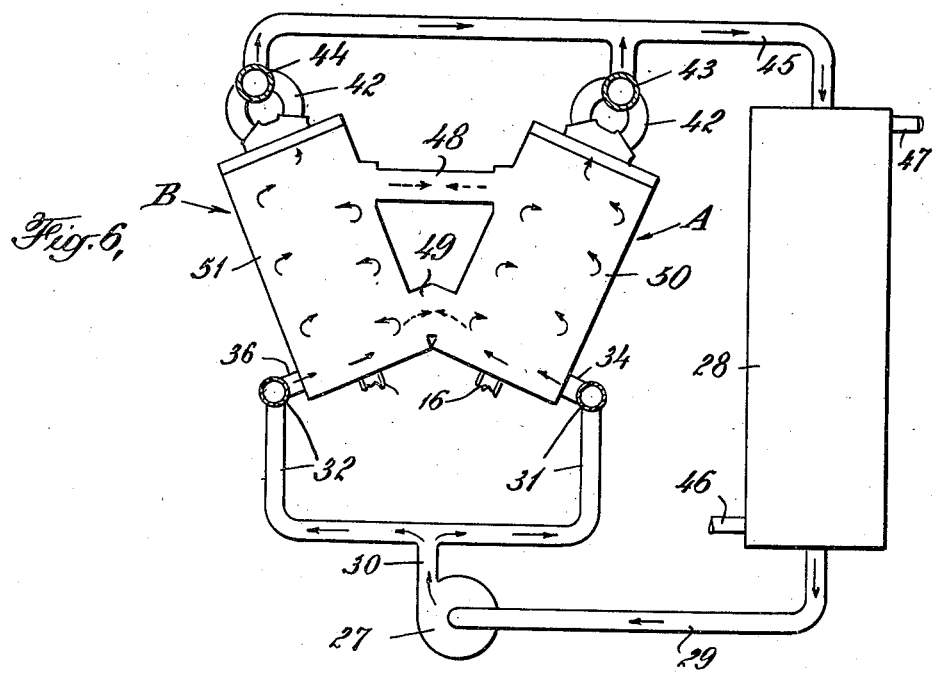
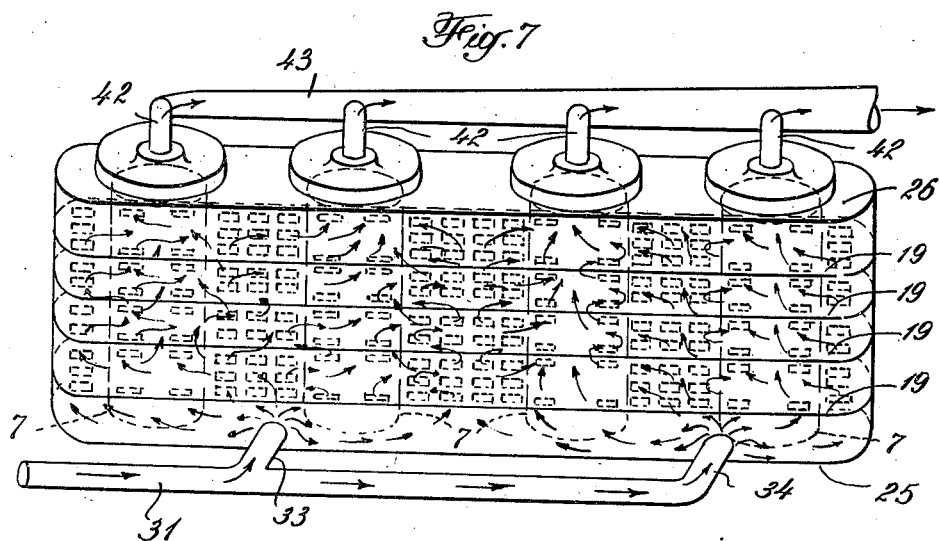
INVENTOR
OTTO E. SZEKELY
BY
HIS ATTORNEYS Patented Nov. 23, 1943

2,334,731

UNITED STATES PATENT OFFICE 2,334,731

INTERNAL COMBUSTION ENGINE

Otto E. Szekely, Philadelphia, Pa., assignor to Martin Motors, Inc., Dover, Del., a corporation of Delaware Application December 19, 1941, Serial No. 423,658

28 Claims. (Cl. 123—173)

This invention relates to high compression apparatus, particularly heavy duty high compression apparatus such as internal combustion engines and compressors, especially those of the V-type, and, more particularly, to internal combustion engines of the compression ignition type.

In high compression apparatus, whether used as an internal combustion engine or for compressing air or other gases, a large quantity of heat has to be removed continuously from the surfaces of the operating cylinders in order to prevent the internal parts of the apparatus from reaching temperatures so high as to damage the parts or impair lubrication. This surplus heat is removed by the cooling system which provides for the circulation of a fluid around, and in intimate contact with, the parts of the apparatus required to be cooled, such as the cylinders and cylinder heads. In liquid cooled apparatus, a liquid such as water is circulated first through jackets surrounding the cylinders and cylinder heads and then through a heat exchanger or radiator by which the heat is removed from the circulating liquid.

In V-type high compression apparatus, the cylinders are arranged in two banks in angular relation to one another. It is important in order to operate the apparatus at maximum power output and efficiency to have all of the cylinders operate at as nearly the same temperature as possible. Because, however, of the separation of the cylinders into banks, there are various factors which tend to produce variation in temperature between the two banks. This may be caused, for example, when an engine is exposed to a cross wind as is apt to occur at sea, by the unequal exposure of the two banks of cylinders to the wind. It may also be caused by variation in the combustion in the cylinders of the two banks, or by an obstruction in the cooling system pipe lines. One of the principal objects of the present invention is to provide a construction in which these difficulties are overcome and in which the operating temperatures of two banks of cylinders in proximity to one another is equalized automatically.

Another object of the invention is to provide a device for assisting in equalizing the operating temperatures of the two banks of cylinders in V-type apparatus and at the same time interconnecting the two banks mechanically so as to form them into a comparatively rigid structure.

Another feature of my present invention is the provision of a cylinder block construction which will bring about rapid heat transfer to the cooling liquid and consequently particularly effective cooling of the apparatus.

A further object of the invention is the provision of a cylinder block construction which possesses great strength per unit of weight.

Another object is the provision of a cylinder block structure in which great strength and unusually effective cooling characteristics are inherent.

With these objects in view the invention resides in the construction, combination and arrangement of the various parts of the high compression apparatus hereafter illustrated and described.

The inventive idea is capable of receiving a variety of mechanical expressions and, for the purpose of illustrating the invention, one of these is shown in the accompanying drawings in the form of a heavy duty compression ignition internal combustion engine. It is to be understood, however, that these drawings are for the purpose of illustration only, and are not intended to define the limits of the invention, reference being directed to the accompanying claims.

In these drawings:

Fig. 1 is a view in transverse vertical section taken on the planes indicated by broken line !—! of Fig. 3 of a V-type compression ignition engine;

Fig. 2 is a view in side elevation of the engine looking from the right of Fig. 1 with the upper portion cut away and showing a longitudinal section through the right-hand bank of cylinders as indicated by broken line 2—2 of Fig. 1, the left hand bank of cylinders being omitted for the sake of clearness;

Fig. 3 is a developed horizontal section near the inner ends of the cylinders and taken on the planes indicated by broken line 3—3 of Fig. 1;

Fig. 4 is a similar section near the outer ends of the cylinders and taken on the planes indicated by broken line 4—4 of Fig. 1;

Fig. 5 is a fragmentary isometric projection, or so-called perspective view, of a portion of the cylinder block to illustrate its open cellular construction;

Fig. 6 is a diagrammatic view representing the cooling liquid circulating system; and Fig. 7 is a diagrammatic perspective view looking from the side of one bank of cylinders to indicate the distribution and tortuous flow of the cooling fluid through the open cellular cylinder block structure.

Referring now to the accompanying drawings, the engine has two banks of cylinders A and B arranged at an angle to one another in V formation and as shown in Fig. 1. In the engine shown each of the banks A and B has four cylinders each, although any suitable number of cylinders may be used. As illustrated, the two cylinder banks, or blocks, A and B are integral with each other and with the engine base 1, being cast or constructed of aluminum alloy, cast iron or other suitable material.

Engine base 1 is provided with suitable structural cross members 2 at spaced intervals throughout its length for supporting the bearings 3 in which the engine crank shaft 4 rotates. A crank case or pan 5 closes the bottom of the engine and is bolted to the base 1 as shown.

The engine cylinders comprise cylinder liners 6 removable from the outer end of the cylinder block and supported in a manner to be described later. While the engine may be provided with any suitable type of valve mechanism, the engine illustrated is provided with a single sleeve valve 7 for each cylinder. These valves are each operated by individual eccentrics (not shown) to which they are connected by eccentric straps, one of which is shown at 8 in Fig. 2.

The valve sleeves are provided with inlet ports 9 which cooperate with the air admission ports 10 in the walls of the cylinder liners 6 and with the cylinder heads and pistons to control the timing, admission and cut-off of the air. A similar row of exhaust ports 11 at the upper ends of the valve sleeves 7 cooperate with exhaust ports 12 in the cylinder liners and with the pistons to control the engine exhaust. The combustion air supply for the engine is from an elongated air supply chamber 13 arranged between the two banks of cylinders and in the bottom of which there are air passages 14 leading downwardly to the air admission ports 10.

Pistons 15 reciprocate within the valve sleeve 7 and are operatively connected with the crank shaft 4 by means of connecting rods 16. The fuel is injected by means of nozzles 17 in each of the cylinder heads or covers 18.

In order to provide a cylinder block construction which possesses great strength per unit of weight, and which also affords large cooling jacket surface area so as to enable large amounts of heat to be removed rapidly from the vicinity of the engine cylinders, the interior of each cylinder block is constructed of three groups of perforated intersecting web-like or plate-like members. Each of these groups consists of a plurality of such members arranged in suitably spaced parallel relation. One of these groups comprises the web-like members 19 which are arranged transversely to the axes of the cylinder liners 6.

The other two groups are parallel with the axes of the engine cylinders but are at right angles to each other. One of these groups comprising web-like members 20 is disposed crosswise of the cylinder block and these crosswise members are arranged in spaced relation from one end of the block to the other in the spaces between and about the various cylinder liners. The other of these two groups consists of a series of spaced longitudinal plate-like members 21 parallel with the cylinder axes and extending from one end to the other of the cylinder block except where interrupted by the cylinder openings 22. These cylinder openings 22 are circular openings formed in the axially transverse web-like members 19 and are suitably spaced apart to suit the positions of the cylinders with respect to the engine cranks.

In this way the interior of the cylinder block is divided up to form an open cellular structure comprising numerous open rectangular polyhedral cells, as shown in detail in Fig. 5, these cells each being bounded or formed by three sets of intersecting rod-like members formed by the intersections of the three sets of perforated web-like members mentioned above. It will be understood that these plate-like, or rod-like, members 19, 20 and 21 terminate integrally with the respective outside walls of the cylinder blocks, that is to say, the side walls 23 and the end walls 24. It will also be understood that the web-like members 21 which are arranged transversely of the engine extend from side to side of the engine, as shown in Fig. 3, at the lower part of the engine block, although these walls extend only from side to side of the cylinder banks at the upper portion of the engine blocks.

The perspective view, Fig. 5, shows that portion of the cylinder block within the dot and dash lines of Fig. 3 between cylinders 2 and 3 of bank B. The horizontal cells (in this instance four) which extend between cylinders 2 and 3 can be identified in both views. In the vertical direction the cells shown in Fig. 5 correspond to those shown between cylinders 2 and 3 in Fig. 2, cylinder blocks A and B being similar in their construction. Thus it will be seen that there is a series of open cells (five being shown in this embodiment) between the bottom wall of the cylinder block, indicated by numeral 25, and the top wall, indicated by numeral 26. Fig. 5 is shown with this top wall removed.

It will be understood that the horizontal web-like members 19 which are arranged transversely of the cylinder axes need not be uniformly spaced apart from one another, but their number and spacing depends upon the arrangement of the air intake and exhaust zones. Neither need the spacing of the groups of web-like members 20 and 21 be uniform, but both the number of these members and their spacing can be chosen to suit the dimensions and arrangement of the engine cylinders of any particular engine.

The cylinder liners 6 are fitted with tight joints at the cylinder openings 22 between the liners and the top and bottom walls of the engine block; also between the liners and the transverse web-like members 19 at the intake and exhaust zones. Hence the space within the walls of the cylinder blocks and surrounding the cylinder liners constitutes a closed space or cooling liquid jacket for the circulation of a suitable coolant such as water or anti-freeze solution.

This cooling liquid, as shown diagrammatically in Fig. 6 is circulated by means of one or more mechanically driven pumps 27 from a cooling radiator or heat-exchanger 28 through conduits 29 and 30 and branch pipes 31 and 32 leading one to each side of the engine. The coolant enters the cooling chamber for cylinder bank A through connections 33 and 34 of the jacket for bank B through connections 35 and 36. All four of these connections are located near the bottom of the engine block. The coolant is thus supplied to each of the cooling liquid jackets for the two cylinder blocks at substantially the same pressure.

The water flows upwardly from the connections 33 and 34 of cylinder block A in a tortuous path as caused by the division of the cooling liquid chamber into the open rectangular polyhedral cells (see Fig. 7). The coolant flows through the labyrinthian passageways formed by the cellular structure of the cylinder blocks distributing itself in all directions from the two inlets 33 and 34 of one block and 35 and 36 of the other block. The general flow of the coolant is in the upward direction to the top of each block where surrounding each of the cylinder liners there is a series of outlet openings 37.

Passing through openings 37 the coolant flows into an annular passage 38 substantially surrounding each of the cylinder heads 18. This passage extends first radially inward and then toward the crank shaft to the inner end of the cylinder head. At this point the liquid passes through openings 39 in a cylindrical wall 40 and thence outwardly through annular passageway 41 to the dual outlet connection 42 which is provided at the top of each cylinder on the outlet manifold 43 for cylinder block A. A similar manifold 44 is provided for cylinder block B. These manifolds are connected to a common return conduit 45 by which the coolant flows back to the heat exchanger 28, such as might be used on shipboard. Sea water would be circulated through the heat exchanger by the inlet and outlet connections 46, 47.

As mentioned in the introduction, engines may be operated under such conditions that one cylinder block or bank will tend to have a higher operating temperature than the other, thus reducing the power output, fuel economy, or both. In order to overcome this difficulty the improved engine is provided with cross connecting conduits 48 arranged near the tops of the cylinder blocks, and cross connecting passageways 49 near the bottoms of the cylinder blocks (Figs. 1, 3, 4 and 6).

The upper cross connections 48 are preferably placed opposite the hottest portion of each cylinder cooling jacket 50 and 51, these reference numerals being used to indicate the cellular cooling liquid space as a whole surrounding the cylinders of banks A and B, respectively (see Figs. 4 and 6). Thus, as shown in the drawings conduits 48 are placed opposite the tops of the cylinders at the exhaust zone level.

They are located in the V of the motor and extend across the space between the opposite walls of the air supply chamber 13. They are preferably cast integrally with the engine block and are of sufficient cross sectional area to provide for the unobstructed flow of coolant crosswise between the two cooling jackets 50 and 51 of the two cylinder banks so that cross flow may be occasioned in either direction by a small difference in pressure. Such small differences in pressure may be occasioned by difference in density of the cooling liquid in the two cooling jackets 50 and 51 caused by a difference in temperature. Hence the cross flow of the coolant might be referred to as thermosiphonic circulation. Cross connections 48 are distributed as shown in Fig. 4 substantially uniformly throughout the length of the engine block and for greatest effectiveness are arranged substantially opposite each pair of cylinders. In addition to providing for the interchange of coolant between the two banks, they also serve to mechanically tie together the upper portions of the two banks of cylinders, thereby increasing the strength and rigidity of the engine block.

In connection with the lower cross connecting passageways 49, these provide for an interchange of fluid between the lower portions of the cylinder jackets 50 and 51 with small difference in pressure. Even with these passages omitted, however, the remaining perforations in the web-like members 20 and 21 are so arranged as to connect the lower portions of the two cylinder jackets or coolant spaces 50 and 51 of the two banks of cylinders.

Referring now to the diagrammatic view, Fig. 6, if the operating temperature of one of the banks of the cylinders should be higher than the other, there would occur a cross flow of coolant in both cross passages 48 and 49 which would tend to equalize the operating temperatures of the two banks. Thus, for example, assuming that the operating temperature of bank A is 200° F. while that of bank B is only 180° F. (a difference in temperature which might occur in an engine not provided with the cross connections 48) the coolant in the lower temperature cooling jacket 51 would be denser than that within cooling jacket 50. This would mean that the pressure in the lower portion of jacket 51 would be greater than the pressure in the lower portion of jacket 50, so that there would be a cross flow from left to right in Fig. 6, or, what is the same thing (referring to Fig. 3) from the cellular passages surrounding the lower ends of the cylinders of bank B crosswise toward the cellular area surrounding the lower ends of the cylinders in bank A.

A larger volume, therefore, flows upwardly through the water jacket space 50 of bank A, and this flow is at somewhat higher velocity than the flow in jacket 51 of bank B. Both of these factors, the increased volume and the higher velocity, produce a greater cooling effect surrounding the cylinders of bank A, removing the heat from them more rapidly than the heat is being removed from bank B, and thus lowering the temperature until equilibrium is reached between the two banks. The increased flow just mentioned takes place upwardly in jacket 51 as far as the cross connections 48, at which point a cross flow occurs in the opposite direction from the cross flow between the bottoms of the cylinder jackets.

A condition not unlike the above would be caused to take place should a difference in operating temperature of the bank occur due to any cause whatsoever; that is to say, whether the temperature difference was occasioned by a cross wind, as hereinbefore mentioned, or by an obstruction in the flow of coolant to one bank or the other, as might be caused, for example, by dents being made in one of the coolant supply branches 34 or 36.

By means of the improvements above set forth, a V-type construction for high compression apparatus, such, for example, as Diesel engines, has been provided which possesses great strength for its weight and at the same time exposes an unusually large amount of cooling jacket area to the circulating coolant. In addition, the cross flow connections serve automatically to level out the operating temperatures in the two banks of cylinders. The two improvements cooperate with one another in improving operation since the extensive cooling area provided by the cellular cylinder block construction enables a slight difference in the flow of the coolant between the two banks, to quickly change the operating temperature so as quickly to reduce the temperature in the bank that tends to operate at too high a temperature.

It will be understood that the invention is not limited to the exact details shown in the drawings, but that changes may be made without departing from the spirit of the invention, the scope of which is set forth in the appended claims.

I claim:

1. In an internal combustion engine having a pair of cylinders in proximity to one another, a cooling liquid chamber for each cylinder, means providing forced circulation of cooling liquid through said chambers and means providing a path for cross flow circulation of said cooling liquid between said chambers permitting automatic interchange of cooling liquid between said chambers thereby tending automatically to equalize the temperatures of the cylinders.

2. In an internal combustion engine having a pair of cylinders in proximity to one another, a cooling liquid chamber for each cylinder, a common supply of mechanically circulated cooling liquid connected to said chambers, and means providing a path for cross flow of said cooling liquid between said chambers permitting automatic interchange of cooling liquid between said chambers thereby tending automatically to equalize the temperatures of the cylinders.

3. In an internal combustion engine having a pair of cylinders in proximity to one another, a cooling liquid chamber for each cylinder, means for supplying cooling liquid under substantially the same pressure to both of said cooling liquid chambers and means providing for cross flow of said cooling liquid between said chambers permitting automatic interchange of cooling liquid between said chambers thereby tending automatically to equalize the temperatures of the cylinders.

4. In apparatus of the character described having a crank shaft and a pair of cylinders in proximity to one another and extending substantially radially from said shaft, a cooling liquid chamber for each cylinder, a liquid cooling device, a circulating pump, connections for the circulation of cooling liquid between said cooling liquid chambers, cooling device and pump, the said chambers being connected in parallel, and cross connections for cooling liquid joining respectively the upper and lower portions of said chambers whereby tendency of variation in the operating temperature of the two cylinders automatically is corrected.

5. In an internal combustion engine having two banks of cylinders in proximity to one another, each of said banks containing a plurality of cylinders, a common cooling liquid chamber for cooling a plurality of the cylinders of each bank, means for supplying cooling liquid under substantially the same pressure to both of said cooling liquid chambers and means providing for cross flow of said cooling liquid between said chambers permitting automatic interchange of cooling liquid between said chambers thereby tending automatically to equalize the temperatures of the cylinders.

6. In apparatus of the class described having a crank shaft and two banks of cylinders in proximity to one another, each of said banks containing a plurality of cylinders extending substanitally radially from said shaft, a common cooling liquid chamber for cooling a plurality of the cylinders of each bank, a common supply of mechanically circulated cooling liquid connected to said chambers, and means providing a plurality of paths for thermosiphonic circulation of cooling liquid between said chambers and distributed substantially uniformly throughout the length of said banks.

7. In apparatus of the character described having a crank shaft and two banks of cylinders in proximity to one another, each of said banks containing a plurality of cylinders extending substantially radially from said shaft, a common cooling liquid chamber for cooling a plurality of the cylinders of each bank, means for supplying cooling liquid under substantially the same pressure to both of said cooling liquid chambers and connections providing thermosiphonic circulation of cooling liquid between said chambers, said connections being disposed in substantially uniformly spaced relation longitudinally of said banks of cylinders.

8. In apparatus of the character described having a crank shaft and two banks of cylinders in proximity to one another, each of said banks containing a plurality of cylinders extending substantially radially from said shaft, and the cylinders of the respective banks being arranged substantially opposite one another in pairs, a common cooling liquid chamber for cooling a plurality of the cylinders of each bank, means for supplying cooling liquid under substantially the same pressure to both of said cooling liquid chambers, and connections providing thermosiphonic circulation of cooling liquid between said chambers, one of said connections being disposed substantially opposite each of said pairs of cylinders.

9. In apparatus of the character described having a crank shaft and two banks of cylinders in proximity to one another, each of said banks containing a plurality of cylinders extending substantially radially from said shaft, a common cooling liquid chamber for cooling a plurality of the cylinders of each bank, a cooling liquid circulating system comprising a liquid cooling device, a circulating pump and said cooling liquid chambers, said chambers being connected in parallel, and a plurality of cross connections for cooling liquid joining respectively the upper and lower portions of said cooling liquid chambers, said connections being arranged in spaced relation longitudinally of said cylinder banks and causing an automatic interchange of cooling liquid between said cooling liquid chambers thereby tending automatically to correct variation in temperature between the cylinders of each bank.

10. In apparatus of the character described, a cylinder block having a cylinder opening therein and comprising web-like members arranged in suitably spaced relation intersecting one another substantially at right angles and dividing the space surrounding the cylinder opening into numerous substantially rectangular cells, the webs forming said cells being perforated to provide passages for the circulation of cooling liquid.

11. In apparatus of the character described, a cylinder block having a plurality of substantially parallel cylinder openings therein and comprising web-like members arranged in suitably spaced relation intersecting one another substantially at right angles and dividing the space between said cylinder openings and surrounding the same into numerous substantially rectangular cells, the webs forming said cells being perforated to provide passages for the circulation of cooling liquid.

12. In apparatus of the character described, a cylinder block comprising three groups of spaced parallel web-like members, one of said groups being arranged transverse to the cylinder axes and two of said groups being parallel thereto but at substantially right angles to one another, the three groups intersecting one another and dividing the block into numerous substantially rectangular cell-like formations, the webs forming said cells being perforated to provide passages for the circulation of cooling liquid, said axially transverse web-like members being provided with spaced cylindrical openings, each to receive an engine cylinder, and the axially parallel web-like members being discontinued at the peripheries of said cylindrical openings.

13. In apparatus of the character described, a cylinder block having a plurality of substantially parallel cylinder openings therein and comprising rod-like members arranged in suitably spaced relation intersecting one another at substantially right angles and dividing the spaces between said cylinder openings and surrounding the same into numerous substantially rectangular open cells, the said structure thus formed serving to increase the strength of the cylinder block and at the same time providing tortuous passages for the circulation of cooling liquid.

14. In V-type high compression apparatus, a pair of cylinder blocks extending angularly from one another from a common base portion, each cylinder block having an open cellular structure exteriorly of the cylinders to support the cylinders and provide a cooling jacket therefor, hollow bracing members spaced throughout the length of the block serving mechanically to join the two cylinder blocks in the V space therebetween, the interiors of said hollow bracing members serving to connect the upper portions of said jackets, connections between the lower portions of said jackets, and means for supplying cooling liquid under substantially the same pressure to both of said cylinder jackets.

15. In apparatus of the character described having a crank shaft and a pair of cylinders in proximity to one another and extending substantially radially from said shaft, a cooling liquid chamber for each cylinder, a common supply of mechanically circulated cooling liquid connected to said chambers, and cross connections for cooling liquid joining respectively the upper and lower portions of said chambers thereby tending automatically to correct variation in the operating temperatures of the two cylinders.

16. In apparatus of the character described having a crank shaft and a pair of cylinders in proximity to one another and extending substantially radially from said shaft, a cooling liquid chamber for each cylinder, means for supplying cooling liquid under substantially the same pressure to both of said cooling liquid chambers, and connections providing thermosiphonic circulation of cooling liquid between said chambers thereby tending automatically to correct variation in the operating temperatures of the two cylinders.

17. In apparatus of the character described having a pair of cylinders in proximity to one another, each of said cylinders having a cooling liquid chamber, a liquid cooling device, a circulating pump, connections for the circulation of cooling liquid between said cooling liquid chambers, cooling device and pump, the said chambers being connected in parallel and cross connections for cooling liquid joining respectively the upper and lower portions of said chambers thereby tending automatically to correct variation in the operating temperatures of the two cylinders.

18. In apparatus of the class described having two banks of cylinders in proximity to one another, each of said banks containing a plurality of cylinders, a common cooling liquid chamber for cooling all of the cylinders of each bank, a common supply of mechanically circulated cooling liquid connected with said chambers, and means providing a plurality of paths for thermosiphonic circulation of cooling liquid between said chambers and distributed substantially uniformly throughout the length of said banks.

19. In an internal combustion engine having two banks of cylinders arranged in V-formation, each of said banks containing a plurality of cylinders, a common cooling liquid chamber for cooling a plurality of cylinders of each bank, a cooling liquid circulating system comprising a liquid cooling device, a circulating pump and said cooling liquid chambers, said chambers being connected in parallel, and a plurality of cross connections for cooling liquid joining respectively the upper and lower portions of said cooling liquid chambers, said connections being arranged in spaced relation longitudinally of said cylinder banks and causing an automatic interchange of cooling liquid between said cooling liquid chambers thereby tending automatically to correct variation in temperature between the cylinders of each bank.

20. A V-type cylinder block comprising a pair of cylinders each having a cooling liquid chamber extending longitudinally thereof, a liquid connection constituting a common supply of cooling liquid to the lower portions of said chambers, and a hollow brace member between the cylinders disposed outwardly from said connection mechanically tying the cylinders together and constituting a cross connection for liquid between the outer portions of said cooling liquid chambers.

21. A V-type cylinder block for apparatus of the character described comprising two banks each containing a plurality of cylinders, a common cooling liquid chamber for cooling a plurality of cylinders of each bank, liquid connection consisting of a common supply of cooling liquid to the inner portions of said cooling liquid chambers, and hollow brace members between said banks disposed outwardly of said connections and in spaced parallel relation mechanically to tie together the two banks of cylinders and to constitute passages for cooling liquid between the outer portions of said cooling liquid chambers.

22. In V-type high compression apparatus, a pair of cylinder blocks extending angularly from one another from a common base portion, each cylinder block having a cooling jacket disposed exteriorly of the cylinders, hollow bracing members spaced throughout the length of the block serving mechanically to join the two cylinder blocks in the V-space therebetween, the interiors of said hollow bracing members serving to connect the upper portions of said jackets, and means for supplying cooling liquid under substantially the same pressure to both of said cylinder jackets.

23. In apparatus of the character described, a cylinder block having a cylinder opening therein and comprising web-like members arranged in suitably spaced relation intersecting one another substantially at right angles and dividing the space surrounding the cylinder opening into numerous substantially rectangular cell-like formations, the greater portions of the walls thereof being removed to provide passages for the circulation of cooling liquid.

24. In apparatus of the character described, a cylinder block having a plurality of cylinder openings therein and comprising web-like members arranged in suitably spaced relation intersecting one another substantially at right angles and dividing the space outward of said cylinder openings into numerous substantially rectangular cell-like formations, the greater portions of the walls thereof being removed to provide passages for the circulation of cooling liquid.

25. In apparatus of the character described, a cylinder block comprising three groups of spaced parallel web-like members, one of said groups being arranged transverse to the cylinder axes and two of said groups being parallel thereto but at substantially right angles to one another, the three groups intersecting one another and dividing the block into numerous substantially rectangular cell-like formations, the greater portion of each wall of said cells being removed to provide passages for the circulation of cooling liquid, said axially transverse web-like members being provided with spaced cylindrical openings, each to receive an engine cylinder, and the axially parallel web-like members being discontinued at the peripheries of said cylindrical openings.

26. In an apparatus of the character described, a cylinder block having a cylinder opening therein and comprising rod-like members arranged in suitably spaced relation intersecting one another at substantially right angles and dividing the space surrounding the cylinder opening into numerous substantially rectangular open cells, the said structure thus formed serving to increase the strength of the cylinder block and at the same time providing tortuous passages for the circulation of cooling liquid.

27. In apparatus of the character described having a pair of cylinders in proximity to one another, each of said cylinders having a cooling liquid chamber, a liquid cooling device, a circulating pump, connections for the circulation of cooling liquid between said cooling liquid chambers, cooling device and pump, the said chambers being connected in parallel, and a cross connection for cooling liquid joining the upper portions of said chambers thereby tending automatically to correct variation in the operating temperatures of the two cylinders.

28. In apparatus of the character described having two banks of cylinders in proximity to one another each of said banks containing a plurality of cylinders, a common cooling liquid chamber for cooling a plurality of cylinders of each bank, a cooling liquid circulating system comprising a liquid cooling device comprising a circulating pump and said cooling liquid chambers, said chambers being connected in parallel, and a plurality of cross connections for cooling liquid joining the upper portions of said cooling liquid chambers, said connections being arranged in spaced relation longitudinally of said cylinder banks and causing an automatic interchange of cooling liquid between said cooling liquid chambers thereby tending automatically to correct variation in temperature between cylinders of each bank.

OTTO E. SZEKELY.